US012470850B2

(12) United States Patent
Berkovich et al.

(10) Patent No.: US 12,470,850 B2
(45) Date of Patent: Nov. 11, 2025

(54) READOUT METHODS FOR FOVEATED SENSING

(71) Applicant: Meta Platforms Technologies, LLC, Menlo Park, CA (US)

(72) Inventors: Andrew Samuel Berkovich, Sammamish, WA (US); Jack Thomas Lavier, Sammamish, WA (US); Reid Frederick Pinkham, Bellevue, WA (US); Shlomo Alkalay, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 132 days.

(21) Appl. No.: 18/208,236

(22) Filed: Jun. 9, 2023

(65) Prior Publication Data

US 2024/0007771 A1    Jan. 4, 2024

Related U.S. Application Data

(60) Provisional application No. 63/358,021, filed on Jul. 1, 2022.

(51) Int. Cl.
    *H04N 25/78*     (2023.01)
    *H04N 25/40*     (2023.01)

(52) U.S. Cl.
    CPC ............. *H04N 25/78* (2023.01); *H04N 25/40* (2023.01)

(58) Field of Classification Search
    CPC ...... H04N 25/78; H04N 25/40; H04N 19/103; H04N 21/4728; H04N 19/167;

(Continued)

(56) References Cited

U.S. PATENT DOCUMENTS

| 6,252,989 B1 * | 6/2001 | Geisler | H04N 19/64 |
| | | | 375/E7.161 |
| 6,839,452 B1 * | 1/2005 | Yang | H04N 25/445 |
| | | | 348/E3.02 |

(Continued)

FOREIGN PATENT DOCUMENTS

| CN | 105979216 A | 9/2016 |
| EP | 3993390 A1 | 5/2022 |

(Continued)

OTHER PUBLICATIONS

European Search Report for European Patent Application No. 23182840.1, dated Oct. 16, 2023, 17 pages.

(Continued)

*Primary Examiner* — Chiawei Chen
(74) *Attorney, Agent, or Firm* — Freestone Intellectual Property Law PLLC; Aaron J. Visbeek

(57) ABSTRACT

Systems and readout methods for foveated sensing may include a pixel array, readout circuitry, and processing logic. The pixel array may have a number of pixels. The readout circuitry may be configured to read image data from the pixel array for each of the plurality of pixels. The processing logic may be configured to identify a number of regions of interest (ROIs) within the pixel array. The processing logic may be configured to associate the image data for the pixels with one or more ROIs. The processing logic may be configured to arrange the image data into data frames. The data frames may include the image data ordered by ROI. Image data for inactive pixels may be removed from the image data and data frames prior to transmission. The processing logic may be configured to transmit the data frames in an order that is based on the ROIs.

8 Claims, 12 Drawing Sheets

(58) Field of Classification Search
CPC ............... H04N 19/17; H04N 19/172; H04N 21/234345; H04N 21/816; H04N 25/42; H04N 25/445; H04N 25/443; G06F 3/013
See application file for complete search history.

(56) References Cited

U.S. PATENT DOCUMENTS

| | | | |
|---|---|---|---|
| 7,525,586 B2 * | 4/2009 | Loose | H04N 25/44 348/308 |
| 10,091,441 B1 * | 10/2018 | Northcott | H04N 5/772 |
| 10,572,764 B1 * | 2/2020 | Bastani | G06F 3/013 |
| 10,867,368 B1 * | 12/2020 | Sharma | G06T 3/053 |
| 11,379,952 B1 * | 7/2022 | Sharma | G06T 3/00 |
| 2005/0226022 A1 | 10/2005 | Kuroda | |
| 2007/0248273 A1 * | 10/2007 | Kortum | H04N 19/162 375/E7.182 |
| 2009/0010555 A1 * | 1/2009 | Kortum | H04N 19/162 375/E7.182 |
| 2009/0097704 A1 | 4/2009 | Savidge et al. | |
| 2015/0077613 A1 * | 3/2015 | Petilli | H04N 25/46 348/308 |
| 2018/0146121 A1 | 5/2018 | Hensler et al. | |
| 2018/0167634 A1 | 6/2018 | Salmimaa et al. | |
| 2019/0318708 A1 | 10/2019 | Tall et al. | |
| 2020/0045250 A1 * | 2/2020 | Geurts | H04N 25/78 |
| 2020/0186831 A1 | 6/2020 | Boyce et al. | |
| 2020/0322571 A1 | 10/2020 | Awai | |
| 2021/0168315 A1 | 6/2021 | Cook | |
| 2021/0377485 A1 | 12/2021 | Yoda | |

FOREIGN PATENT DOCUMENTS

| | | |
|---|---|---|
| EP | 3993435 A1 | 5/2022 |
| KR | 20160110779 A | 9/2016 |
| WO | 2021092941 A1 | 5/2021 |

OTHER PUBLICATIONS

LaConte S.M., "Decoding fMRI Brain States in Real-Time," NeuroImage, May 15, 2011, vol. 56, No. 2, pp. 440-454.
Office Action mailed Feb. 3, 2025 for European Patent Application No. 23182840.1, filed on Jun. 30, 2023, 11 pages.

* cited by examiner

READOUT METHODS FOR FOVEATED SENSING

CROSS-REFERENCE TO RELATED APPLICATIONS

This application claims priority to U.S. provisional Application No. 63/358,021 filed Jul. 1, 2022, which is hereby incorporated by reference.

TECHNICAL FIELD

This disclosure relates generally to image sensing, and in particular to foveated sensing.

BACKGROUND INFORMATION

Artificial reality devices have ever-growing applications and utility. However, delays between capturing images and displaying image data (i.e., latency) can reduce the enjoyment of an artificial reality experience. Additionally, the utility of an artificial reality device decreases once the battery dies, so reducing power consumption of artificial reality devices may extend the duration of use of the devices between charges.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
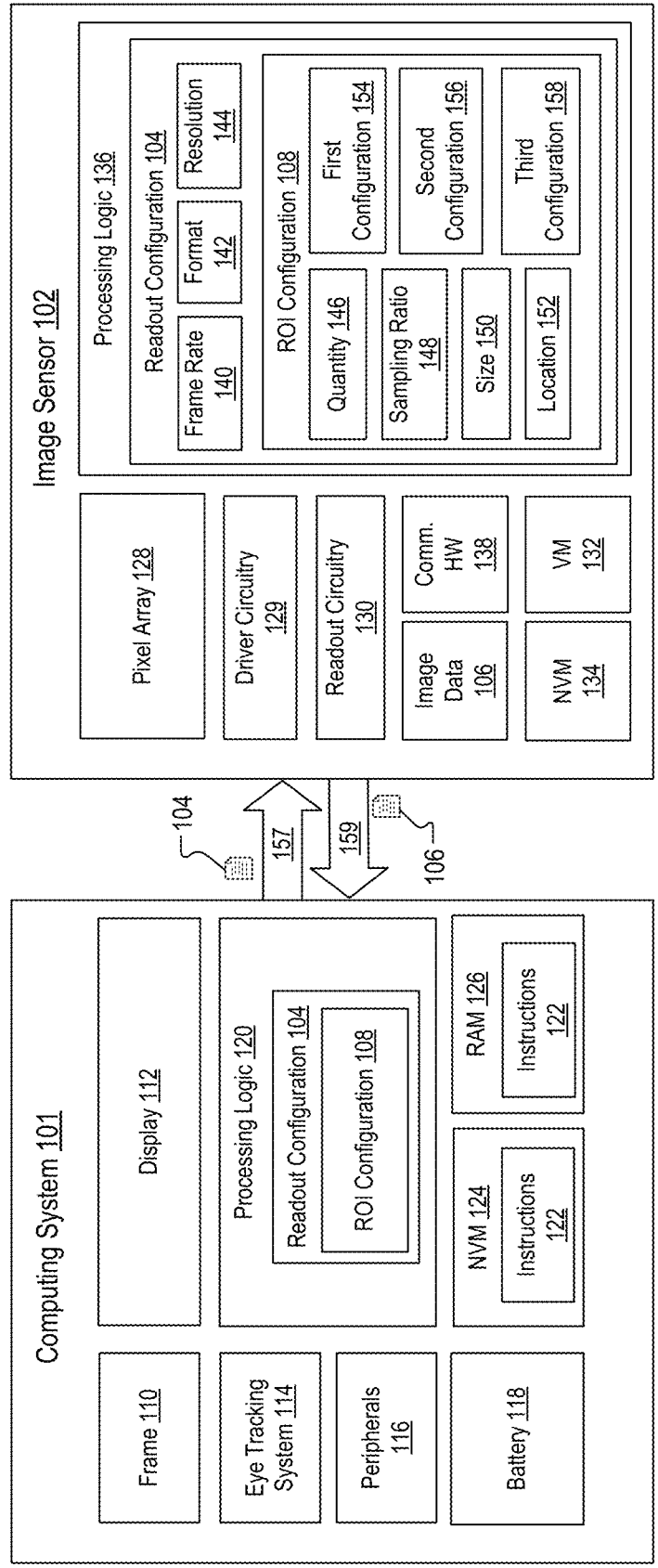
FIGS. 1A and 1B illustrate example block diagrams of an artificial reality system and of ROI configuration definitions, in accordance with aspects of the disclosure.

Embodiments of readout methods and systems for foveated sensing are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Foveated sensing refers to the capture of image data for a number of regions of interest (ROIs) in an image or a pixel array. Foveated sensing for images is a digital image processing technique in which the image resolution, or amount of detail, varies across an image. Foveated sensing encompasses a subset of features from sparse sensing, which includes an efficient capture and reconstruction of image data. A foveated image data may refer to the capture and/or transmission of image data for one or more nested ROIs, each of which having an associated sampling ratio. Implementing foveated sensing in an artificial reality system (e.g., in a head-mounted device) may advantageously allow an image sensor to improve use of system resources (energy, latency, data generated/processed) within a single data frame based on various factors. Some of the factors may include scene content, user state (e.g., gaze, attention), application (e.g., artificial intelligence (AI) assistant, pass-through, 3D reconstruction, etc.), and system constraints (e.g., power, latency, accuracy/performance tradeoffs).

Conventional image sensors readout a continuous block of pixels with a constant spatial resolution. By contrast, foveated ROIs of image data capture a spatially varying resolution (e.g., using a varying sampling ratio) of a scene. However, existing pipelines are not well-designed to process data formats for spatially varying resolutions. One of the challenges with processing spatially varying resolutions is that subsequent rows of data readout from an image sensor may vary in size. Another challenge is that within a single row, a sampling ratio may vary such that a vision algorithm needs to be aware of (or designed to handle) such variations to correctly extract visual information. Furthermore, different vision algorithms may be set up to process regions or levels of a foveated ROI differently. In any case, the interface between foveated image sensors and computing systems (e.g., a head-mounted device) is non-trivial.

Transmitting entire (e.g., full resolution) image data frames of a pixel array of an image sensor to a head-mounted device, such as an augmented reality (AR) or virtual reality (VR) device, can inefficiently reduce battery life, consume processing resources, and contribute to display update latencies. Since the human eye (e.g., fovea) only focuses on a small portion of a scene at any given time, foveated rendering (e.g., updating a limited portion of an image frame) may provide improved battery life and improved display update latency. Embodiments of the disclosure include ROI configurations for reading ROIs, processing ROIs, and transmitting ROIs to support foveated image processing.

An artificial reality system may be configured to use ROI configurations to reduce latency and power consumption related to capturing and transferring image data, in accordance with aspects of the disclosure. The artificial reality system may include a computing system communicatively coupled to an image sensor. The computing system may be configured to determine a readout configuration and an ROI configuration for the image sensor. The image sensor may implement the ROI configuration and provide foveated image data to the computing system in accordance with the ROI configuration.

The ROI configuration may include a first ROI configuration, a second ROI configuration, and a third ROI configuration. One or more of the ROI configurations may be combined. The first ROI configuration includes grouping image data for each ROI into an individual data frame and transmitting the ROIs one after another. A pixel array may be read multiple times (once for each ROI) to store image data for all of the ROIs on-chip, or the pixel array may be read once with the ROIs being grouped using on-chip digital signal processing.

The second ROI configuration includes grouping image data into sub-frames of ROIs one pixel array row at a time. Each row of the pixel array may be read once, and the image data for the row is reordered into row-based ROI image data. For example, if a single row of the pixel array includes three ROIs, the image data of the first ROI is grouped together in a first sub-frame, the image data of the second ROI is grouped together in a second sub-frame, and the image data of the third ROI is grouped together in a third sub-frame. The several ROI sub-frames may be sent one row at a time to reduce latency and to reduce on-chip memory usage.

The third ROI configuration may be applied to the first or second ROI configurations. The third ROI configuration includes identifying image data for inactive pixels and active pixels. The third ROI configuration then includes removing the image data for inactive pixels from data frames or sub-frames to reduce the amount of data transmitted and received from the image sensor. The image data for any of the ROI configurations may be zero-padded to produce fixed line lengths, or the computing system may be configured to handle the varying data sizes based on ROI configuration that was determined by the computing system. Advantageously, the disclosed ROI configurations may improve operations of an artificial reality device by, for example, reducing data transfer bandwidth, reducing image data update latencies in a display, reducing use processing resources, and reducing battery consumption, according to embodiments of the disclosure.

Foveated and sparse sensing is agnostic to sensor architecture. Foveated and sparse sensing concepts can be applied to both global shutter and rolling shutter image sensors as well as to digital pixel sensors, charge domain analog pixel sensors, and voltage domain analog pixel sensors. While the architecture impacts power gating mechanisms, readout speeds, and secondary effects like pixel shading or light leakage, the overall architecture does not impact the ability to operate in a foveated manner and support the ROI configurations and interfaces disclosed herein.

The readout methods, systems, and apparatuses for foveated sensing that are described in this disclosure may advantageously reduce battery consumption and image-related latency to improve the operation of a head-mounted device. These and other embodiments are described in more detail in connection with FIGS. 1A-6.

FIG. 1A illustrates an example block diagram of an artificial reality system 100 that is configured to use a number of ROI configurations to interface a computing system 101 with an image sensor 102, in accordance with aspects of the disclosure. Examples of artificial reality system 100 may include an artificial reality headset, holographic applications, automotive windshield augmented reality display, and other similar technologies. Computing system 101 is configured to provide a readout configuration 104 to image sensor 102 and is configured to receive image data 106 from image sensor 102 that has been formatted in accordance with a particular ROI configuration 108, according to an embodiment. By providing image data 106, in accordance with ROI configuration 108, computing system 101 may reduce battery consumption, communications bandwidth usage, and latency of image data 106 from image sensor 102, according to an embodiment. Thus, ROI configuration 108 may advance head-mounted device and other artificial reality technology by extending the amount of time the device may be used (e.g., between charges) and may provide an enhanced immersive artificial reality experience that more closely resembles real-time. A head-mounted device is one type of artificial reality smart device. In some contexts, Artificial reality system 100 is a head-mounted device or a head-mounted display (HMD) that is configured to provide artificial reality. Artificial reality is a form of reality that has been adjusted in some manner before presentation to the user, which may include, e.g., virtual reality (VR), augmented reality (AR), mixed reality (MR), hybrid reality, or some combination and/or derivative thereof.

Computing system 101 may include a number of components to support an artificial reality interface with the user and image sensor 102, in accordance with aspects of the disclosure. Computing system 101 may include a frame 110, a display 112, an eye tracking system 114, peripherals 116, a battery 118, and processing logic 120, according to an embodiment. Frame 110 may be configured to be worn on or about a head of a user. Frame 110 may be configured to carry image sensor 102, display 112, and the other components of artificial reality system 100. Frame 110 may be implemented as a VR headset, AR glasses, or some other artificial reality headwear.

Display 112 is configured to provide visual content as part of an artificial reality device. Display 112 may be implemented as a liquid crystal display (LCD) (e.g., a fast-switch LCD), an organic light-emitting diode (OLED) display, a waveguide, or another type of display. Display 112 may be integrated into a windshield or rear-view mirror of a vehicle. Display 112 may be used to provide various user interface elements (e.g., text, buttons, menus, etc.), video, images, multi-media content, or other two-dimensional (2D) or three-dimensional (3D) content to a user. Display 112 may be configured to provide foveated image data 106 that provides a highest resolution of image data 106 in an ROI around an area of focus of an eye of user, for example.

Eye tracking system 114 is configured to determine and provide a gaze vector, a region of focus, an eye orientation, and/or a relative eye position, according to an embodiment. Eye tracking system 114 may include a number of light sources (e.g., infrared light sources), image sensors, and/or photo detectors to support triangulation-based, pupil-based, image-based, and/or time-of-flight-based detection to determine a gaze vector for a user. Eye tracking system 114 may include and use data from a gyroscope or accelerometer to determine a general orientation or gaze vector of artificial reality system 100. In one embodiment, eye tracking system 114 is configured to use an orientation of artificial reality system 100 (e.g., of a head-mounted device) to estimate a gaze vector. Eye tracking system 114 may provide a gaze vector or eye orientation to processing logic 120 to enable processing logic 120 to determine ROI configuration 108, in an embodiment.

Peripherals 116 may include speakers, haptics, and/or light sources that are configured to enhance the artificial reality experience of the user. The speakers, haptics, and/or light sources are configured to provide sounds, sensations, and illumination that support artificial reality content or that otherwise provides feedback to the user.

Battery 118 may be configured to power computing system 101 and image sensor 102. Battery 118 may have a power consumption rate that varies based on the operations of computing system 101 and/or image sensor 102. Processing logic 120 may be configured to monitor power levels of battery 118. Processing logic 120 may be configured to manage or extend the power level of battery 118 by employing ROI configuration 108, according to an embodiment.

Processing logic 120 may operate as a controller for computing system 101 and artificial reality system 100, in accordance with aspects of the disclosure. Processing logic 120 is configured to determine a readout configuration 104 and ROI configuration 108 to at least partially define operations of image sensor 102. Processing logic 120 may base readout configuration 104 and/or ROI configuration 108 on a gaze vector or eye orientation received from eye tracking system 114, according to an embodiment. By defining readout configuration 104 for image sensor 102, processing logic 120 may use one or more predetermined algorithms for deciphering and decoding image data 106, which has been formatted with a particular ROI configuration 108. Processing logic 120 may be configured to provide foveated images or video to display 112 at least partially based on the content of image data 106 and ROI configuration 108, according to an embodiment. Processing logic 120 may be configured to execute instructions 122 stored in non-volatile memory (NVM) 124 and/or stored in volatile memory (VM) 126, according to embodiments of the disclosure.

Image sensor 102 is configured to receive readout configuration 104 from computing system 101 and is configured to provide image data 106 in a format that is based on ROI configuration 108, in accordance with aspects of the disclosure. Image sensor 102 may be implemented as a complementary metal-oxide semiconductor (CMOS) image sensor and may be configured to convert light signals into representative electrical signals. Image sensor 102 includes a pixel array 128, driver circuitry 129, readout circuitry 130, VM 132, NVM 134, processing logic 136, and communications hardware 138, according to an embodiment.

Pixel array 128 includes a number of photosensitive pixels that are configured to convert photons into electrical signals. Pixel array 128 includes pixels that are organized by rows and columns within pixel array 128. The pixels in pixel array 128 may be read and transmitted as image data. Particular rows and/or columns of pixels may be selectively skipped over to sparsely read out all or part of pixel array 128. In one embodiment, pixel array 128 may be associated with one or more ROI levels, with each ROI level having a unique resolution or sampling ratio, in accordance with aspects of the disclosure.

Driver circuitry 129 is coupled to pixel array 128 and is configured to reset, refresh, and/or operate the pixels of pixel array 128. Driver circuitry 129 may receive various configuration instructions from processing logic 136. Based on the configuration instructions, driver circuitry 129 may be configured to selectively drive or operate particular rows and/or columns of pixel array 128.

Readout circuitry 130 is coupled to pixel array 128 and is configured to extract image data 106 from the pixels of pixel array 128, according to an embodiment. Readout circuitry 130 may be coupled to each of the columns of pixel array 128 to support reading image data 106 one or more rows at a time. Readout circuitry 130 may store image data 106 in VM 132 and/or NVM 134 for buffering, image processing, and/or formatting, according to various embodiments.

Readout circuitry 130 may be configured to readout image data 106 from pixel array 128 in accordance with ROI configuration 108. For example, readout circuitry 130 may be configured to read each row of pixel array 128 as many times as ROI levels exist in the row. In another embodiment, readout circuitry 130 may be configured to read each row (e.g., active row) of pixel array 128 one time to enable on-chip ROI processing of image data 106. In one embodiment, readout circuitry 130 is configured to read pixels that have been designated as active pixels and may be configured to skip the readout of pixels that are designated as inactive pixels.

Processing logic 136 is coupled to driver circuitry 129, readout circuitry 130, and VM 132 to format image data 106 by implementing a particular ROI configuration 108, in accordance with aspects of the disclosure. Processing logic 136 includes readout configuration 104, and readout configuration 104 includes ROI configuration 108, according to an embodiment. Readout configuration 104 may be received from processing logic 120 or computing system 101 over communications channel 157. Readout configuration 104 may include a frame rate 140, a format 142, and a resolution 144 that is applied to driver circuitry 129 and/or readout circuitry 130 for reading the pixels of pixel array 128, according to an embodiment. Frame rate 140 may include the number of frames per second (fps) the pixel array 128 is read. Format 142 may define whether image data 106 is transmitted as raw image data, Bayer data, RGB data, YUV data, or some other format, for example. Resolution 144 may specify whether the entire pixel array 128 is to be read, or if a global sampling ratio is to be applied, regardless of ROI configuration, for example. Communication channels 157 and 159 may couple image sensor 102 to computing system 101 of artificial reality system 100. Communication channels 157 and 159 may include or be routed through one or more wired communication protocols, such as MIPI, CSI1, or CSI2, according to an embodiment.

ROI configuration 108 defines one or more particular configuration settings for ROIs requested and defined by processing logic 120, in accordance with aspects of the disclosure. ROI configuration 108 may include a quantity 146, a sampling ratio 148, a size 150, and a location 152 of the ROIs in pixel array 128. Quantity 146 includes a number of ROIs to be associated with pixel array 128 and image data 106. Quantity 146 may include 2-5 ROIs, for example. Sampling ratio 148 determines how many pixels are skipped or deemed inactive within each row and for each ROI. Each ROI may be associated with a particular level, and each level may include a different sampling ratio 148. For example, a first ROI may be designated as ROI level 1, may be the largest, and may have a sampling ratio of 8:1 where one out of eight pixels are included in the image data for the first ROI. A sampling ration of 8:1 may also be a designation of seven inactive pixels for every one active pixel. A second ROI may be designated as ROI level 2, may be the second largest, and may have a sampling ratio of 4:1 where one out of four pixels are included in the image data for the second ROI, for example. A third ROI may be designated as ROI level 3, may be the third largest, and may have a sampling ratio of 2:1 where one out of two pixels are included in the image data for the third ROI, for example. A fourth ROI may be designated as ROI level 1, may be the smallest, may encompass a foveated region (e.g., a region of focus of an eye), and may have a sampling ratio of 1:1 where each pixel is included in the image data for the fourth ROI. Size 150 and a location 152 of the ROIs may define the length and width of pixels and may indicate a center point or corner point for a particular ROI.

ROI configuration 108 also includes a first ROI configuration 154, a second ROI configuration 156, and a third ROI configuration 158 for reading out and conditioning image data 106 prior to transmission off-chip (e.g., to computing system 101), according to an embodiment. ROI configurations 154, 156, and 158 define how ROI data is grouped and compressed into data frames for transmission.

Figure 1B:
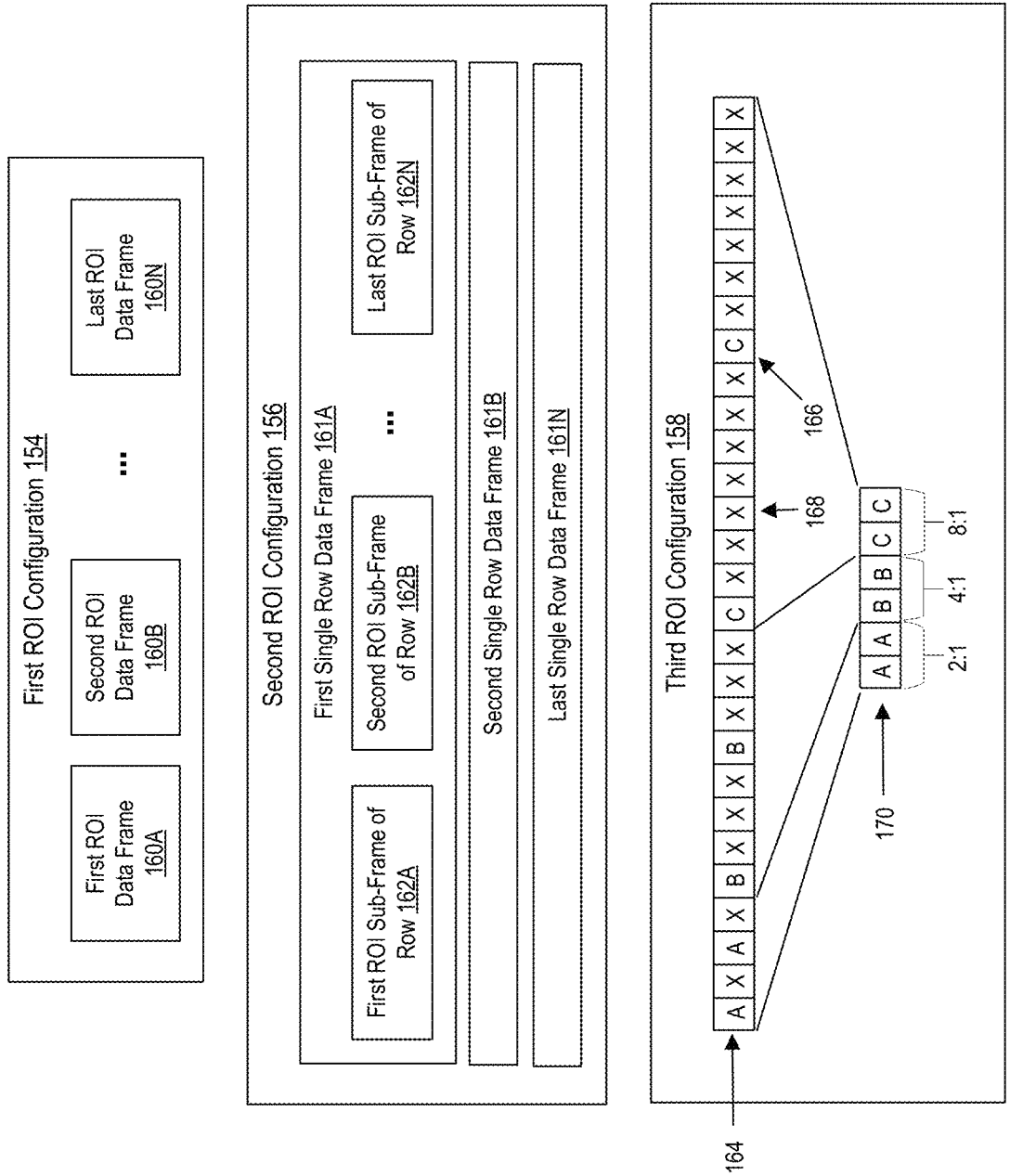

FIG. 1B illustrates example block diagrams of ROI configurations 154, 156, and 158, in accordance with aspects of the disclosure. First ROI configuration 154 includes grouping and transmitting image data for each ROI from pixel array 128 completely, then transmitting image data for one complete ROI after another. To transmit image data for each ROI completely, a particular row of pixel array 128 may be read multiple times—once for each ROI that has image data in a particular row, according to an embodiment. If three ROIs are defined, each row that includes all three ROIs is read three times—once per ROI. If a particular row of pixels includes one or two ROIs, then that particular row is read one or two times, respectively. In one embodiment, to transmit image data for each ROI completely, image data for pixel array 128 may be read once, stored in memory (e.g., VM 132 or NVM 134), and sorted into groups or data frames of ROIs in on-chip memory. Readout circuitry 130 and/or processing logic 136 are configured to: group image data for a first ROI into a first ROI data frame 160A, group image data for a second ROI into a second ROI data frame 160B, and continue to group the image data by ROI until grouping image data for a last ROI into a last ROI data frame 160N, according to an embodiment. ROI data frames 160 (individually, ROI data frame 160A and 160B through 160N) are transmitted (or read from an external computing system, like artificial reality system 100) one complete ROI data frame after another, according to an embodiment.

First ROI configuration 154 can provide several advantages. By treating each ROI as a data frame, computing system 101 and image sensor 102 can configure communications protocols (e.g., MIPI line length, width, or package size) for each ROI. This can result in more efficient use of communications bandwidth (e.g., MIPI bandwidth) by reducing zero-padding of data that may be performed to provide fixed data row sizes.

Second ROI configuration 156 includes reading a single row of pixel array 128 and ordering the ROIs of the single row into single row data frames 161, in accordance with aspects of the disclosure. Single row data frames 161 may individually be referenced as single row data frame 161A and 161B through 161N. Single row data frames 161 may each include a number of ROI sub-frames. Each of the ROI sub-frames include image data for a particular ROI for a particular row. For example, first single row data frame 161A may include a first ROI sub-frame 162A, a second ROI sub-frame 162B, and so forth until a last ROI sub-frame 162N. First ROI sub-frame 162A includes image data for a first ROI that is in the row being read. Second ROI sub-frame 162B includes image data for a second ROI that is in the row being read. Last ROI sub-frame 162B includes image data for a last ROI that is in the row being read. The process of grouping image data into ROI sub-frames is repeated for subsequent pixel array rows as second single row data frame 161B until last single row data frame 161N. Single row data frames 161 are transmitted as one single row data frame after another, according to an embodiment. In one implementation, image data for inactive pixels is removed from single row data frames 161 prior to transmission off-chip.

As an illustrative example of second ROI configuration 156, a single row of pixel array 128 might include image data for two ROIs, for example. The image data of the single row may be read in an order of ROI 1 data followed by combined ROI 1 and ROI 2 data followed by ROI 1 data, which may be written as [ROI 1 data] [ROI 1+2 data] [ROI 1 data]. Second ROI configuration 156 is configured to reorder the image data of the single row into sub-frames (e.g., ROI sub-frames 162) of data that are based on the ROI that the image data is associated with. In the example of two ROIs, the image data may be reordered and grouped into a first sub-frame of ROI 1 data and a second subframe of ROI 2 data, which may be written as [ROI 1 data] [ROI 2 data], for example. In one embodiment, ROI 2 data or the higher-resolution image data may precede (e.g., be transmitted before) ROI 1 data or lower-resolution image data.

Second ROI configuration 156 can have several advantages. On-board memory usage for second ROI configuration 156 may be less than for first ROI configuration 154. The readout time for second ROI configuration 156 may be significantly less than for first ROI configuration 154. Additionally, the decoding process for computing system 101 may be simplified by the reduced memory/buffering usage of second ROI configuration 156, according to an embodiment. Because the size of each row varies based on the number of ROIs in that row, the rows may be padded to fix the row lengths, according to an embodiment. However, in general, the faster readout time and reduced memory consumption of second ROI configuration 156 may advantageously reduce power consumption of artificial reality system 100, computing system 101, and/or of image sensor 102.

Third ROI configuration 158 includes densifying rows of image data, in accordance with aspects of the disclosure. Third ROI configuration 158 includes identifying inactive pixels 168 (denoted as "X" in FIG. 1B) and active pixels 166 (denoted as "A", "B", or "C" in FIG. 1B) for each row 164 of pixels. Inactive pixels 168 are pixels that are designated to be ignored in sparse sensing of pixel array 128, according to an embodiment. For example, for a sampling ratio of 4:1, the image data of one pixel is used while the image data of the remaining three pixels is not used. Third ROI configuration 158 includes removing image data for inactive pixels 168 from row 164 to provide a compressed or densified row 170 of active pixels 166. Rows 164 and 170 illustrate an example of three potential ROIs having sampling ratios of 2:1, 4:1, and 8:1. As illustrated, compressing or densifying rows based on the sampling ratios can significantly decrease the amount of image data 106 that is transmitted for pixel array 128, which may decrease data transmission latency of image sensor 102 and may decrease power consumption of the overall artificial reality system 100, according to an embodiment. Third ROI configuration 158 may be combined with or applied to first ROI configuration 154 and/or second ROI configuration 156, according to an embodiment. The densification process reduces the amount of memory used, and the densification process can be done quickly as digital processing in VM 132 and/or NVM 134. Advantageously, densifying the rows of image data may be performed while not limiting analog readout times and while adding insignificant (e.g., none) overhead to overall readout time of pixel array 128.

Figure 2A:
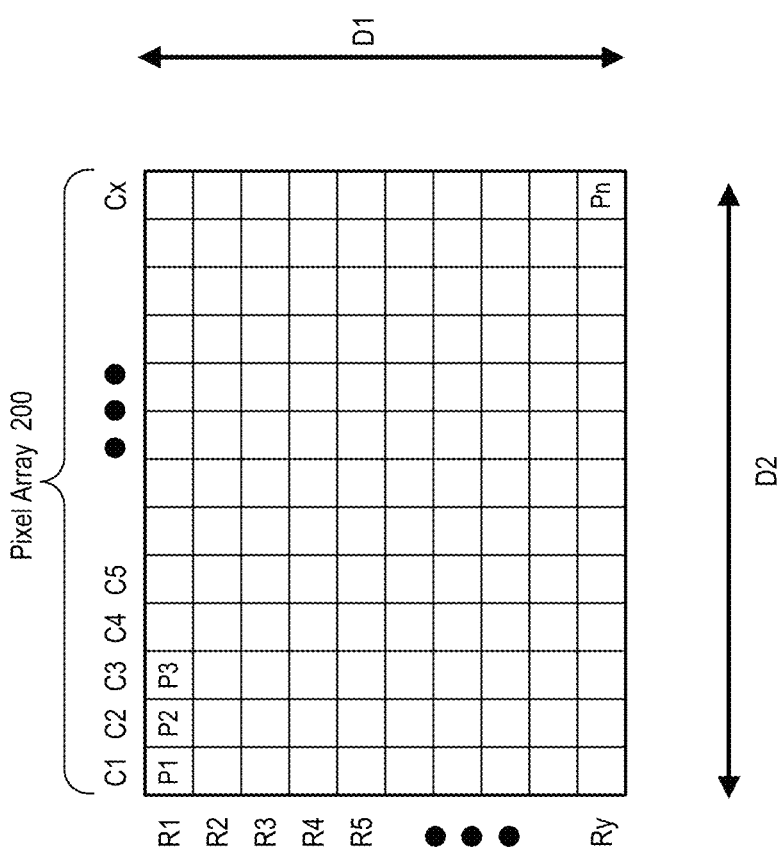
FIGS. 2A, 2B, and 2C illustrate a diagram of a pixel array and diagrams of image data associated with multiple ROI levels, in accordance with aspects of the disclosure.
Figure 2B:
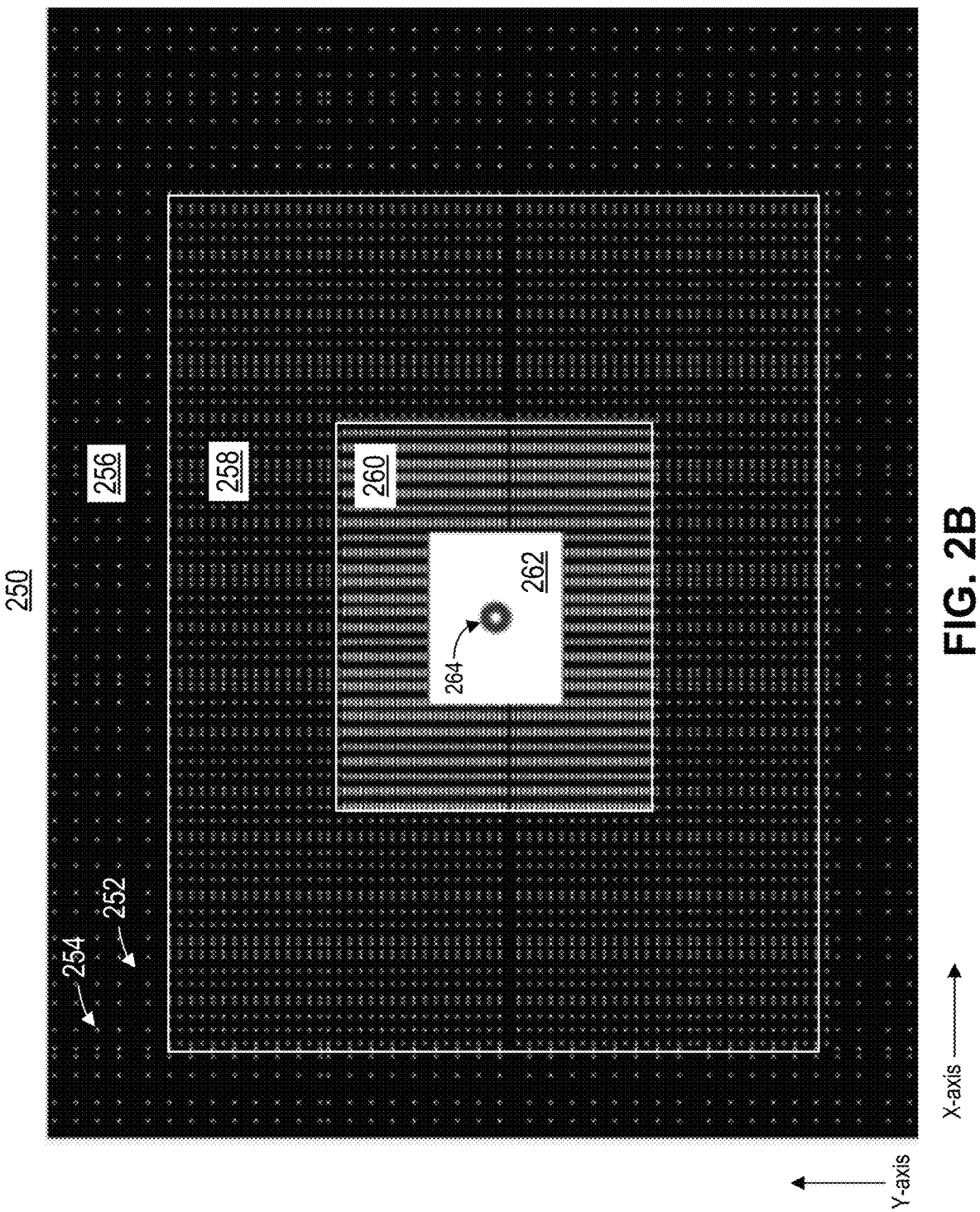
Figure 2C:
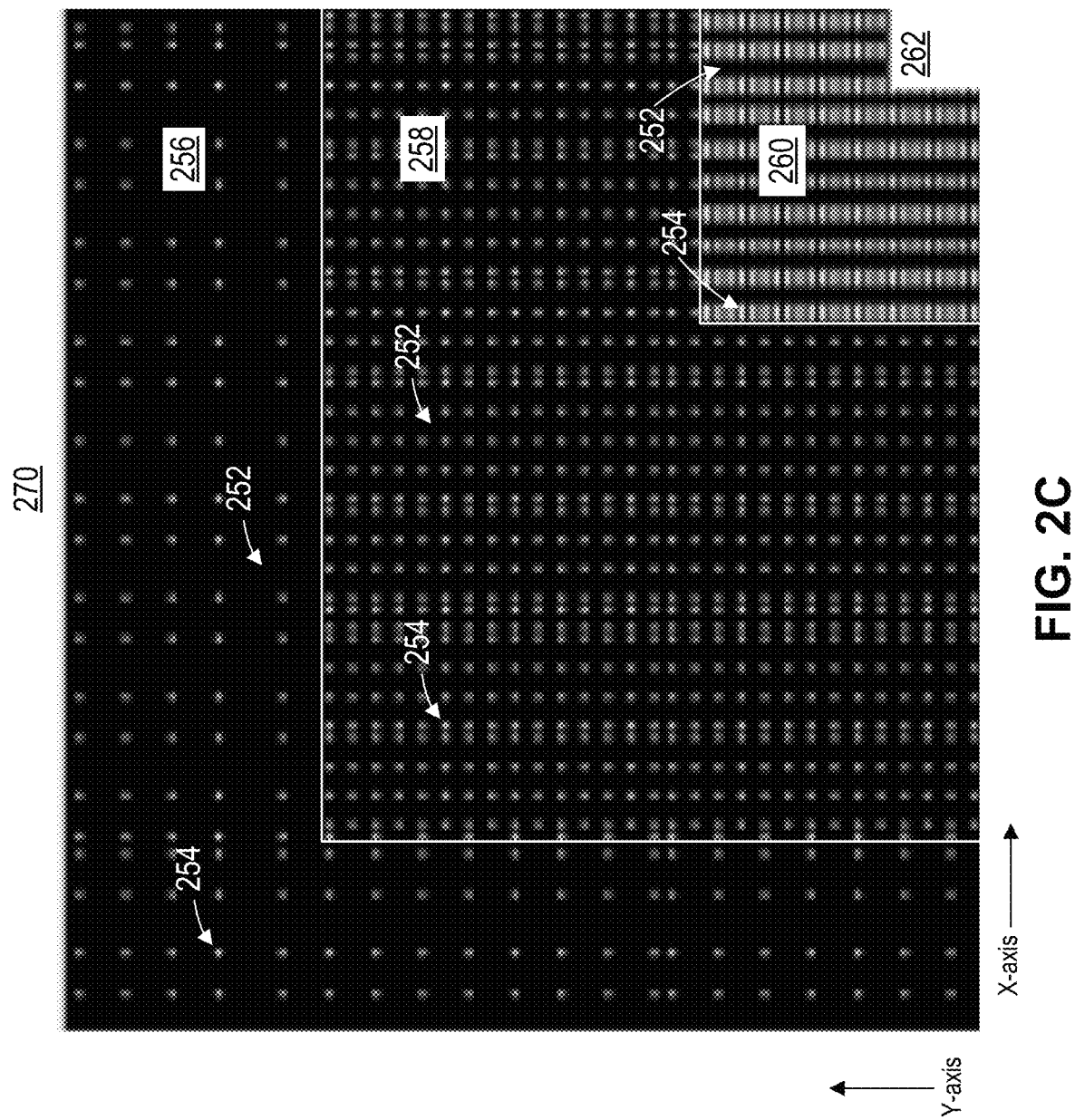

FIGS. 2A, 2B, and 2C illustrate a diagram of a pixel array 200 and diagrams of image data 250 associated with four ROI levels, in accordance with aspects of the disclosure. FIG. 2A illustrates a plan view of pixel array 200 arranged in rows and columns, in accordance with embodiments of the disclosure. The example pixel array 200 includes imaging pixels $P1-P_n$ arranged in rows $R1-R_y$ and columns $C1-C_x$. Pixel array 200 may be included image sensor 102 (shown in FIG. 1A). The imaging pixels in pixel array 200 may include pinned photodiodes having a silicon semiconductor for measuring imaging signals generated by incident imaging light. Readout circuitry of the image sensor (not illustrated) may measure an imaging signal of each imaging pixel that is generated over an integration period. The readout circuitry may readout pixel array 200 using a global shutter readout or rolling shutter readout to form images from the incident imaging light. The readout may provide the imaging signals from each pixel to a digital signal processor (e.g., processing logic 136, shown in FIG. 1A) included in the image sensor, in some embodiments. The physical dimension of pixel array 200 is D1 in the y dimension (rows) and D2 in the x dimension (columns). Pixel array 200 may have 1600 columns and 1200 rows, in some embodiments. Of course, other resolutions of pixel array 200 may be utilized. In one embodiment, the numbers of rows and columns of pixel array 200 are the same and dimension D1 and D2 are the same.

FIG. 2B illustrates an example diagram of image data 250 having four ROI levels, in accordance with aspects of the disclosure. Image data 250 is example image data that may be received from the pixels in pixel array 128 (shown in FIG. 1A) or pixel array 200 (shown in FIG. 2A). Image data 250 includes dark regions 252 that represent image data from inactive pixels or from groups of inactive pixels, according to an embodiment. Image data 250 includes light regions 254 that represent image data from active pixels (e.g., regardless of the readout value of the pixels), according to an embodiment. Image data 250 includes a first ROI level 256, a second ROI level 258, a third ROI level 260, and a fourth ROI level 262. Although four ROI levels are illustrated and described, it is to be understood that fewer (e.g., two) or more (e.g., five) ROI levels could alternatively be used.

Each of the four ROI levels 256, 258, 260, and 262 have different characteristics from each other. For example, each of the four ROI levels 256, 258, 260, and 262 have a different sampling ratio (or resolution), size, and location. In this example, the four ROI levels 256, 258, 260, and 262 have sampling ratios of 8:1, 4:1, 2:1, and 1:1, respectively. The sampling ratios may be the same along the x-axis and y-axis, or the sampling ratios may be different along the x-axis verses the y-axis. Other sampling ratios may be used. When removing image data of inactive pixels, the sampling ratio also becomes a compression ratio for the image data. Each of the four ROI levels 256, 258, 260, and 262 have a size that may be defined as a percentage of the frame of the image data or that may be defined in terms of pixels. As an example, first ROI level 256 may have a size of 100% of the frame of the image data or may have a size of, for example 1600 pixels by 1200 pixels. Fourth ROI level 262 may have a size of 25% of the frame of the image data or may have a size of 400 pixels by 300 pixels, for example. The other ROI levels may have sizes that are between the largest (e.g., the first) ROI level and the smallest (e.g., the fourth) ROI level. Each of the four ROI levels 256, 258, 260, and 262 have a location that may be defined by a center point, by a corner pixel, by more than one corner (which also defines the size), or by some other technique. In one embodiment, fourth ROI level 262 is centered around a fovea center 264, which is an indication of the point of focus of a gaze angle or eye orientation for a user. Although one or more the of ROI levels may be centered on fovea center 264, others may not be centered on fovea center 264 and may be located and/or sized based on other characteristics of, for example, the content (e.g., a scene) of image data 250.

FIG. 2C illustrates an enlarged view 270 of a portion of image data 250 to further illustrate dark regions 252 and light regions 254 in image data 250, in accordance with aspects of the disclosure.

FIGS. 3A, 3B, 3C, and 3D illustrate example implementations of artificial reality headsets and example uses of foveated image data, in accordance with aspects of the disclosure. The example artificial reality headsets are example implementations of artificial reality system 100 (shown in FIG. 1A).

Figure 3A:
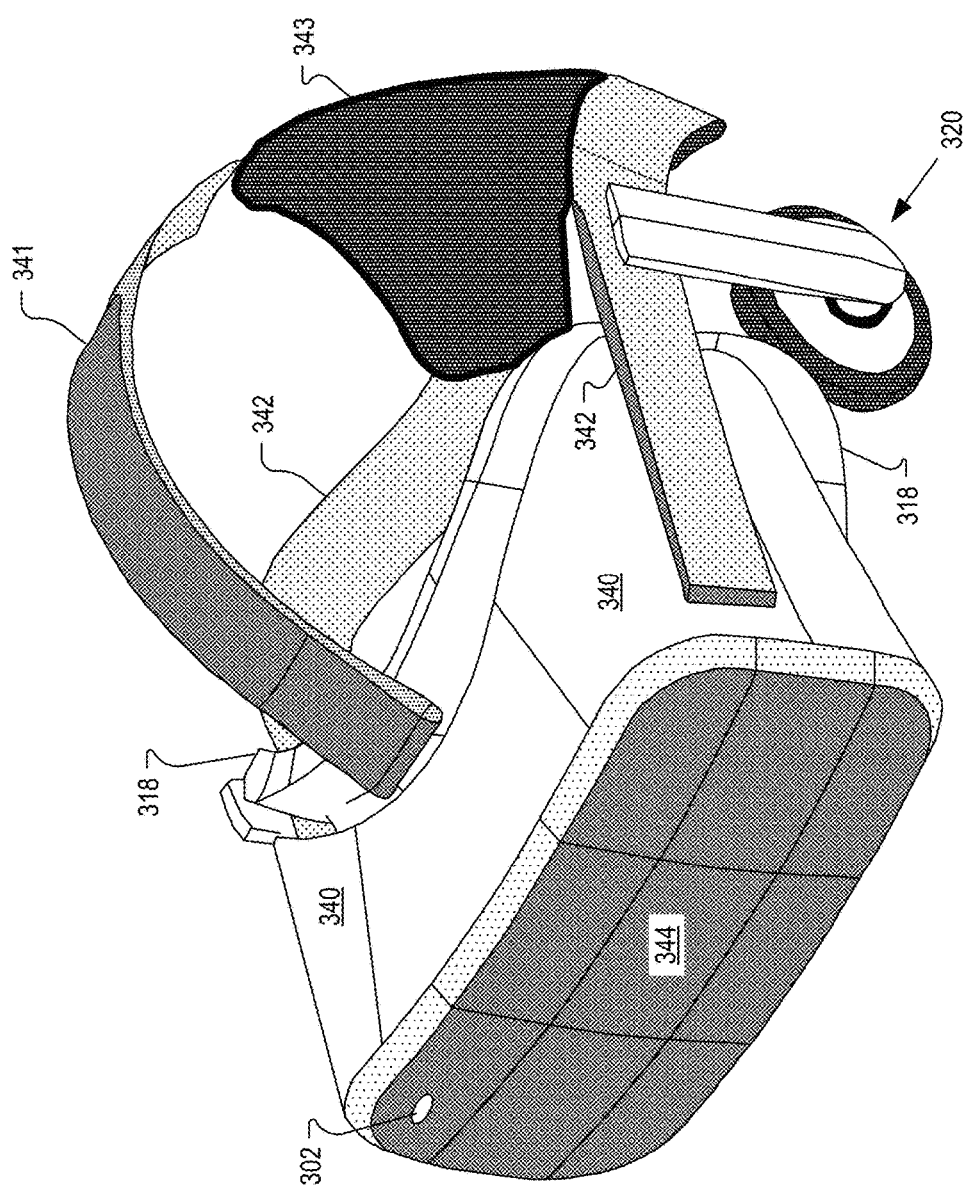
FIGS. 3A, 3B, 3C, and 3D illustrate example implementations of artificial reality headsets and example implementations of foveated image data, in accordance with aspects of the disclosure.

FIG. 3A illustrates an example head-mounted device 300 that may operate as a VR headset and include one or more displays that provide foveated image data to a user using a number of ROI levels, in accordance with an embodiment of the disclosure. Example head-mounted device 300 includes a top structure 341, a rear securing structure 343, a side structure 342 attached with a viewing structure 340 having a front rigid body 344, and an image sensor 302 coupled to the front rigid body 344. The illustrated head-mounted device 300 is configured to be worn on a head of a user of the head-mounted device. In one embodiment, top structure 341 includes a fabric strap that may include elastic. Side structure 342 and rear securing structure 343 may include a fabric as well as rigid structures (e.g., plastics) for securing the head-mounted device to the head of the user. Head-mounted device 300 may optionally include earpiece(s) 320 configured to deliver audio to the ear(s) of a wearer of head-mounted device 300.

In the illustrated embodiment, viewing structure 340 includes an interface membrane 318 for contacting a face of a wearer of head-mounted device 300. Interface membrane 318 may function to block out some or all ambient light from reaching the eyes of the wearer of head-mounted device 300.

Example head-mounted device 300 also includes a chassis for supporting hardware of the viewing structure 340 of head-mounted device 300. Hardware of viewing structure 340 may include any of processing logic, wired and/or wireless data interface for sending and receiving data, graphic processors, and one or more memories for storing data and computer-executable instructions. In one embodiment, viewing structure 340 may be configured to receive wired power. In one embodiment, viewing structure 340 is configured to be powered by one or more batteries. In one embodiment, viewing structure 340 may be configured to receive wired data including video data. In one embodiment, viewing structure 340 is configured to receive wireless data including video data.

Viewing structure 340 may include a display for directing image light to a wearer of head-mounted device 300. The display may include a Liquid Crystal Display (LCD) having a display pixel array of liquid crystal pixels arranged in rows and columns, for example. The display may be configured to provide pass-through and foveated image data that is based on images captured by image sensor 102. Although one image sensor is illustrated, two or more image sensors may be coupled to viewing structure 340 or front rigid body 344 to provide image data to the display.

Figure 3B:
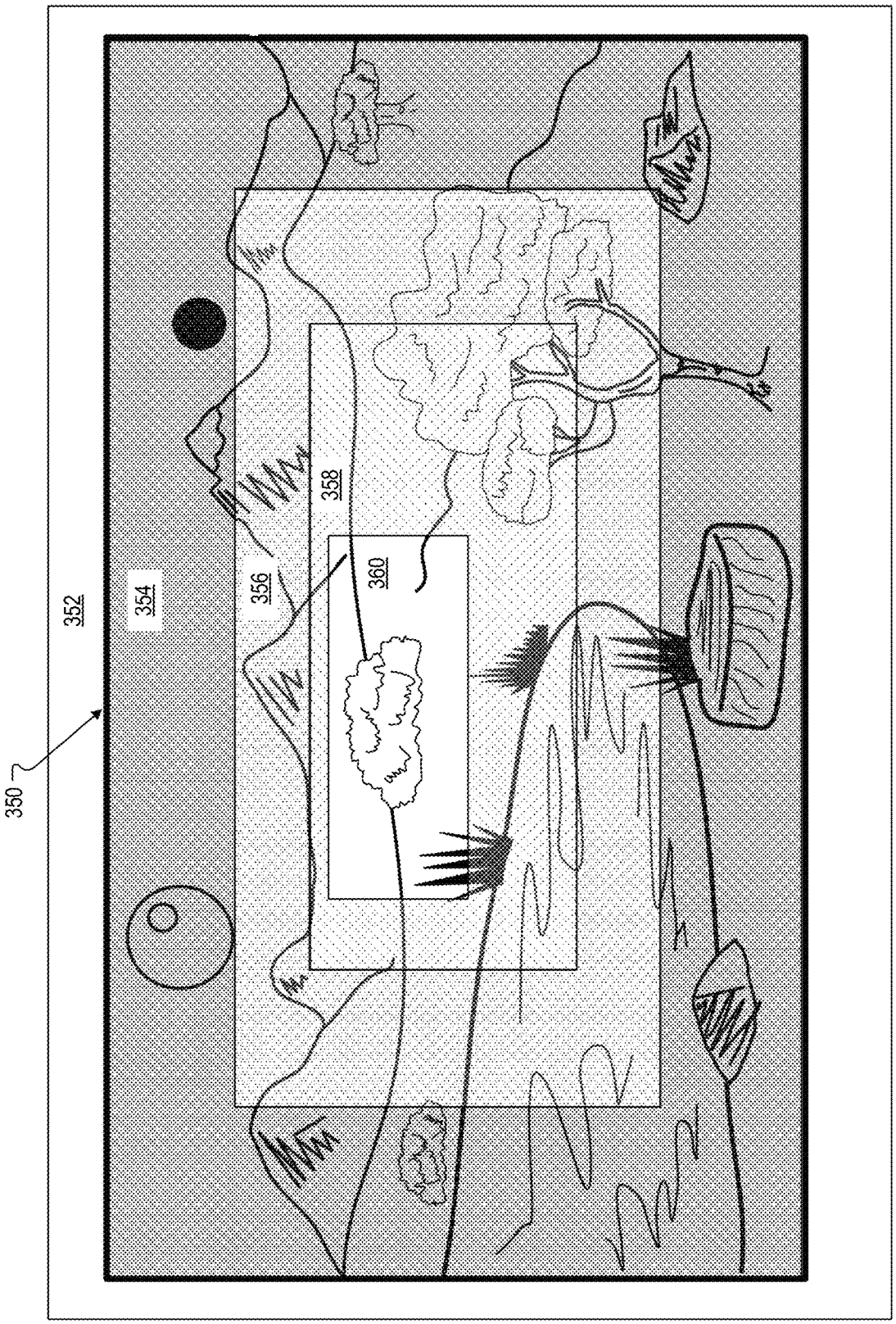

FIG. 3B illustrates a foveated image data 350 of a scene that may be passed-through head-mounted device 300 and displayed on a display 352, in accordance with aspects of the disclosure. ROIs 354, 356, 358, and 360 are nested ROIs that have varying degrees of sampling ratios or resolutions, which may appear more blurry in the outer ROI and gradually less blurry towards the inner-most ROI. The foveated ROIs may be used to mimic peripheral vision and the different levels of focus experienced by the human eye while advantageously reducing battery consumption, decreasing bandwidth usage, and decreasing latency between the capture of an image and the displaying of image data on, for example, display 352, according to an embodiment.

Figure 3C:
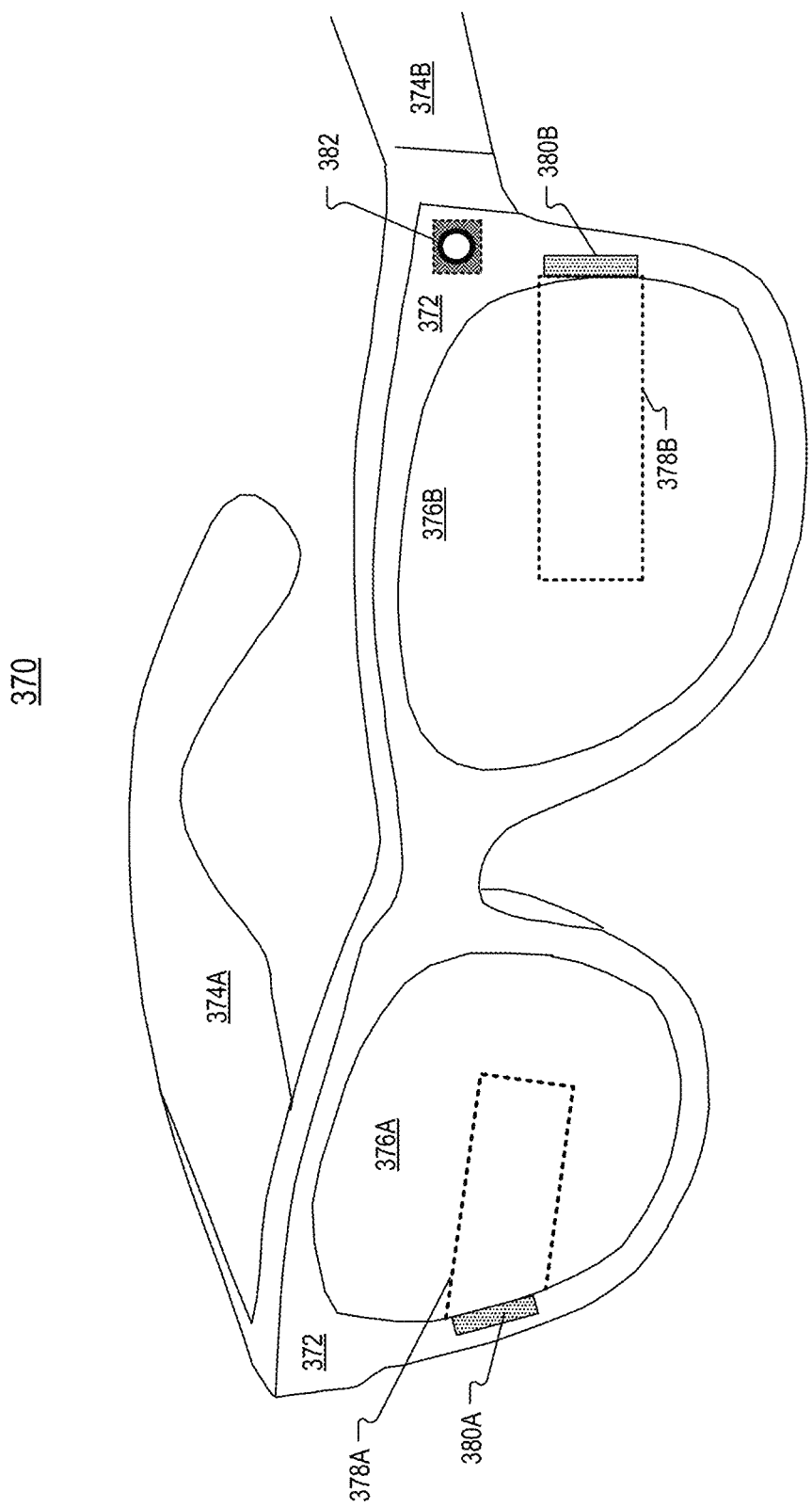

FIG. 3C illustrates an example head-mounted device 370 that may operate as an AR headset and use foveated ROIs to support the user experience, in accordance with aspects of the disclosure. Head-mounted device 370 includes frame 372 coupled to arms 374A and 374B. Lenses 376A and 376B are mounted to frame 372. Lenses 376 may be prescription lenses matched to a particular wearer of the head-mounted device or may be non-prescription lenses. The illustrated head-mounted device 370 is configured to be worn on or about a head of a user of the head-mounted device.

Each lens 376 includes a waveguide 378 to direct display light generated by a display 380 to an eyebox area for viewing by a wearer of head-mounted device 370. Display 380 may include an LCD, an organic light emitting diode (OLED) display, micro-LED display, quantum dot display, pico-projector, or liquid crystal on silicon (LCOS) display for directing display light to a wearer of head-mounted device 370.

Frame 372 and arms 374 of head-mounted device 370 may include supporting hardware. Head-mounted device 370 may include any of processing logic, wired and/or wireless data interface for sending and receiving data, graphic processors, and one or more memories for storing data and computer-executable instructions. In one embodiment, head-mounted device 370 may be configured to receive wired power. In one embodiment, head-mounted device 370 is configured to be powered by one or more batteries. In one embodiment, head-mounted device 370 may be configured to receive wired data including video data via a wired communication channel. In one embodiment, head-mounted device 370 is configured to receive wireless data including video data via a wireless communication channel.

Lenses 376 may appear transparent to a user to facilitate augmented reality or mixed reality where a user can view scene light from the environment around her while also receiving image light directed to her eye(s) by waveguide(s) 378. Consequently, lenses 376 may be considered (or include) an optical combiner. In some embodiments, display light is only directed into one eye of the wearer. In an embodiment, both displays 380A and 380B are included to direct image light into waveguides 378A and 378B, respectively.

An example image sensor 382 is coupled to frame 372. Image sensor 382 may be mounted in other positions of head-mounted device 370. Image sensor 382 may be configured to capture images of front-facing, side-facing, upward, and/or downward view of a scene in which head-mounted device 370 is operated. Image sensor 382 may be configured to provide foveated image data to head-mounted device 370. Head-mounted device 370 may use waveguides 378 and displays 380 to at least partially display images of the scene or may be configured to use the foveated image data to provide an AR experience to the user (e.g., identifying items in the scene), according to embodiments of the disclosure.

Figure 3D:
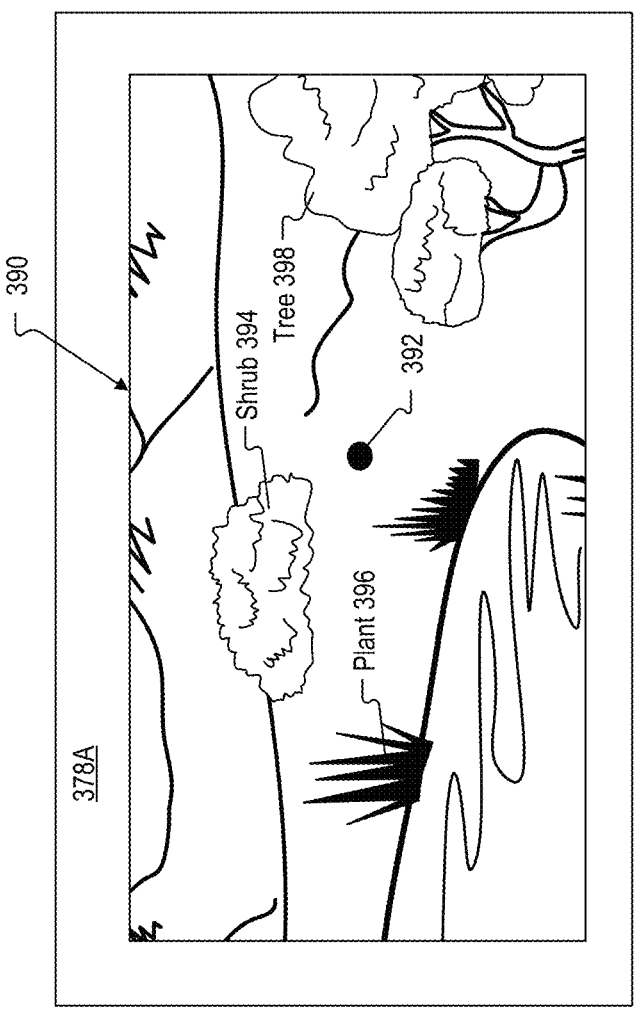

FIG. 3D illustrates an example AR image 390 that head-mounted device 370 may display using foveated image data, in accordance with aspects of the disclosure. For example, image sensor 382 may be configured to provide image data for an ROI that is around a fovea center 392. Head-mounted device 370 may be configured to receive the image data, identify one or more objects in the image data, and display AR image 390 with one or more objects identified or labeled, according to an embodiment. For example, head-mounted device 370 may identify objects as a shrub 394, a plant 396, and a tree 398, as a simplified example.

Figure 4:
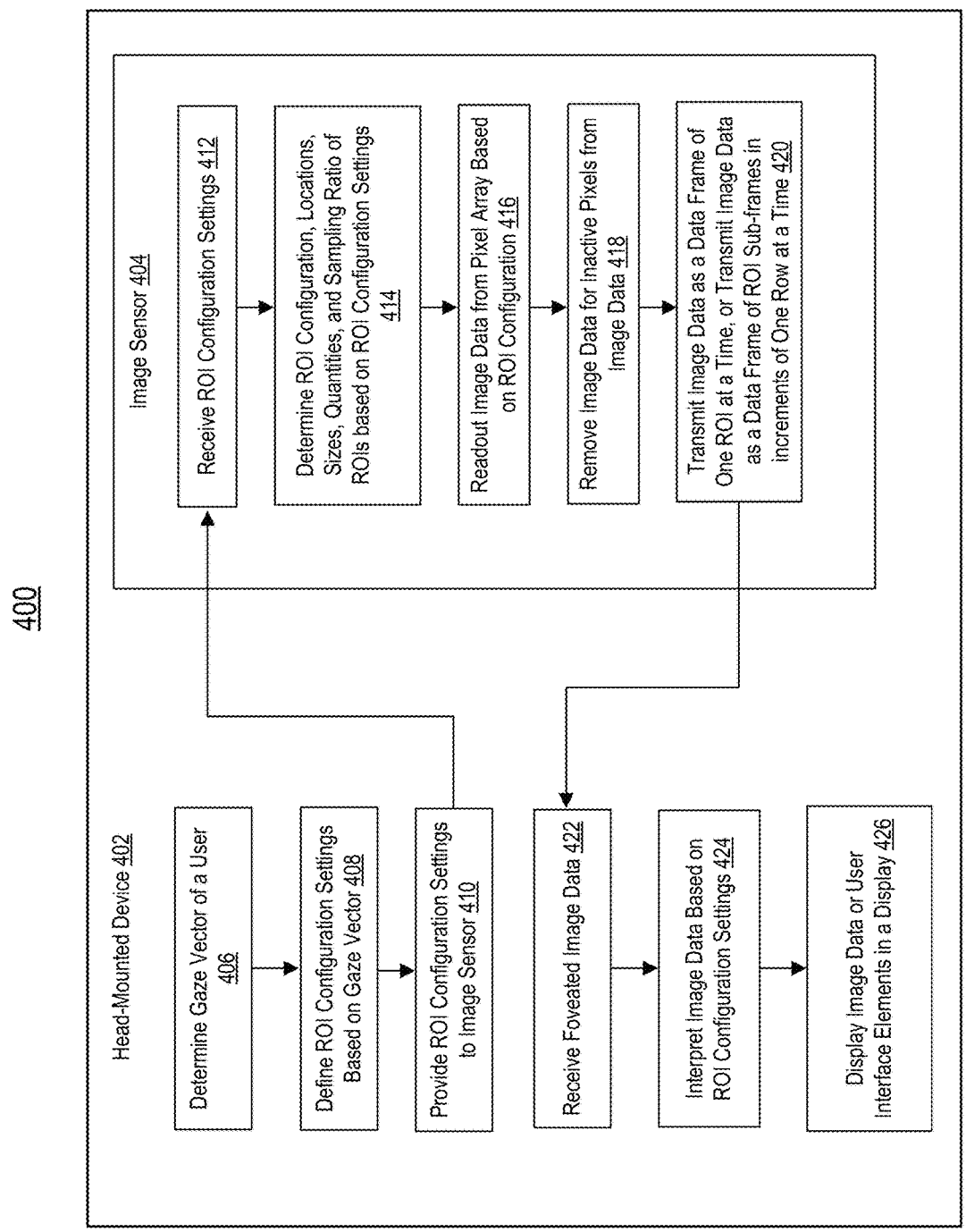
FIG. 4 illustrates a flow diagram of a process for providing foveated image data, in accordance with aspects of the disclosure.

FIG. 4 illustrates a flow diagram of a process 400 for providing foveated image data, in accordance with aspects of the disclosure. Process 400 may be at least partially incorporated into or performed with a head-mounted device 402 and an image sensor 404, according to an embodiment. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

At process block 406, head-mounted device 402 determines a gaze vector of a user, according to an embodiment. The gaze vector may be based on an orientation of an eye or based on an orientation of head-mounted device 402. Process block 406 proceeds to process block 408, according to an embodiment.

At process block 408, head-mounted device 402 defines ROI configuration settings based on the gaze vector, according to an embodiment. Process block 408 proceeds to process block 410, according to an embodiment.

At process block 410, head-mounted device 402 provides ROI configuration settings to image sensor 404, according to an embodiment. Process block 410 proceeds to process block 412, according to an embodiment.

At process block 412, image sensor 404 receives ROI configuration settings from head-mounted device 402, according to an embodiment. Process block 412 proceeds to process block 414, according to an embodiment.

At process block 414, image sensor 404 determines ROI configuration, locations, sizes, quantities, and sampling ratios of ROIs based on the ROI configuration settings, according to an embodiment. Process block 414 proceeds to process block 416, according to an embodiment.

At process block 416, image sensor 404 performs a readout of image data from a pixel array based on the ROI configuration, according to an embodiment. Process block 416 proceeds to process block 418, according to an embodiment.

At process block 418, image sensor 404 removes image data for inactive pixels from the image data, according to an embodiment. Removing image data for inactive pixels is one technique for compressing image data prior to transmission. By reducing the amount of image data sent, power consumption and data latency may be reduced. In one embodiment, image data for inactive pixels is not read out from the pixel array in process block 416. Process block 418 proceeds to process block 420, according to an embodiment.

At process block 420, image sensor 404 transmits image data as a data frame of one ROI at a time, or image sensor 404 transmits image data as a data frame of ROI sub-frames in increments of one row at a time, according to an embodiment. Process block 420 proceeds to process block 422, according to an embodiment.

At process block 422, head-mounted device 402 receives foveated image data from image sensor 404, according to an embodiment. Process block 422 proceeds to process block 424, according to an embodiment.

At process block 424, head-mounted device 402 interprets the image data based on ROI configuration settings, according to an embodiment. Because head-mounted device 402 defines the ROI configuration settings prior to image sensor 404 implementing the ROI configuration settings, head-mounted device 402 may receive and correctly process dynamically changing frames of image data and/or image data in various formats, according to an embodiment. Process block 422 proceeds to process block 426, according to an embodiment.

At process block 426, head-mounted device 402 displays image data or user interface elements in a display, according to an embodiment. The image data may be foveated image data that includes nested ROIs around a particular point of focus (e.g., a fovea center), according to an embodiment. Process 400 may end with process block 426, according to an embodiment.

Figure 5:
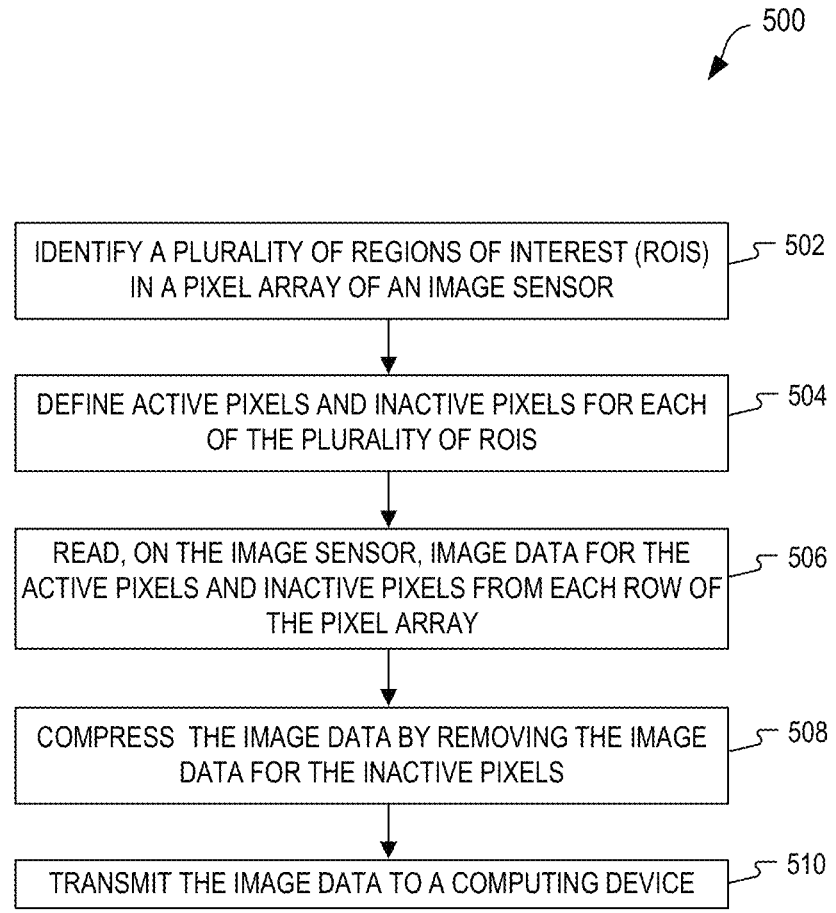
FIG. 5 illustrates a flow diagram of a process for providing foveated image data, in accordance with aspects of the disclosure.

FIG. 5 illustrates a flow diagram of a process 500 for providing foveated image data, in accordance with aspects of the disclosure. Process 500 may be at least partially incorporated into or performed by an image sensor communicatively coupled to a head-mounted device, according to an embodiment. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

At process block 502, process 500 identifies a plurality of regions of interest (ROIs) in a pixel array of an image sensor, according to an embodiment. Process block 502 proceeds to process block 504, according to an embodiment.

At process block 504, process 500 defines active pixels and inactive pixels for each of the plurality of ROIs, according to an embodiment. Process block 504 proceeds to process block 506, according to an embodiment.

At process block 506, process 500 reads, on the image sensor, image data for the active pixels and inactive pixels from each row of the pixel array, according to an embodiment. Process block 506 proceeds to process block 508, according to an embodiment.

At process block 508, process 500 compresses the image data by removing the image data for the inactive pixels, according to an embodiment. Process block 508 proceeds to process block 510, according to an embodiment.

At process block 510, process 500 transmits the image data to a computing device (e.g., a head-mounted device), according to an embodiment.

Process 500 may also include ordering or organizing image data in accordance with first ROI configuration 154 or second ROI configuration 156 (shown in FIGS. 1A and 1), according to an embodiment.

Figure 6:
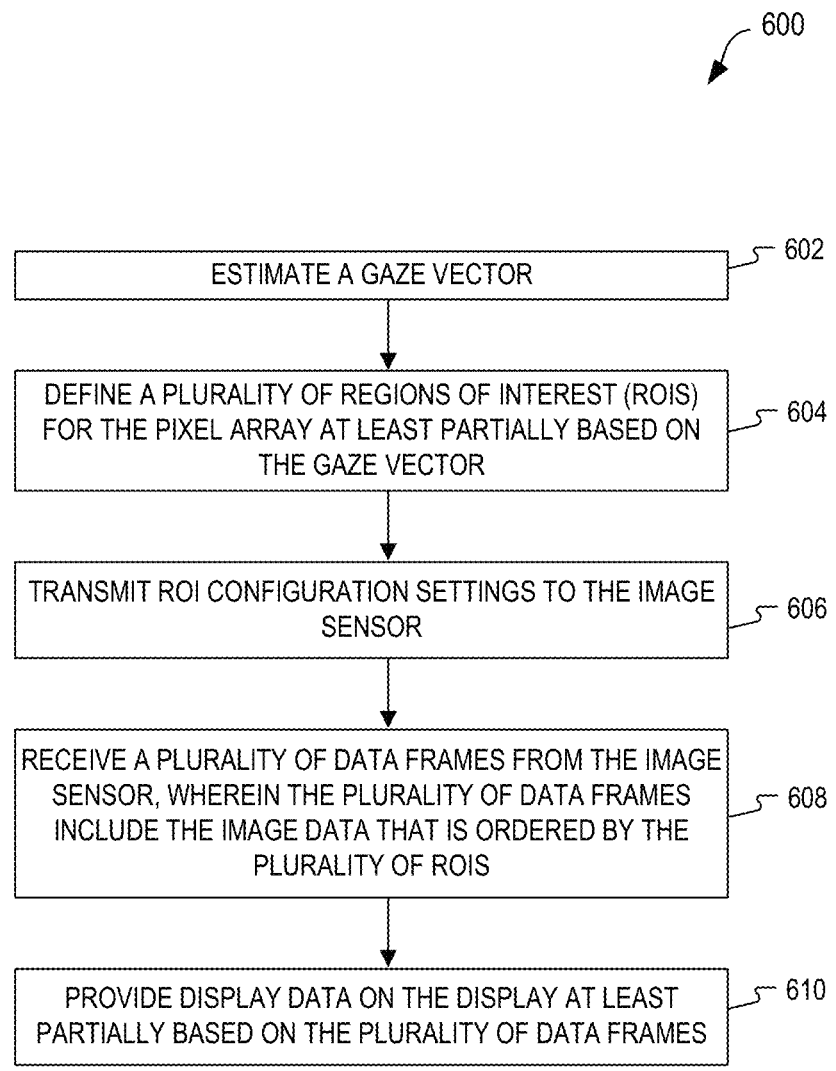
FIG. 6 illustrates a flow diagram of a process for configuring foveated image data, in accordance with aspects of the disclosure.

FIG. 6 illustrates a flow diagram of a process 600 for configuring foveated image data, in accordance with aspects of the disclosure. Process 600 may be at least partially incorporated into or performed by an artificial reality system (e.g., a head-mounted device), according to an embodiment. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

At process block 602, process 600 estimates a gaze vector, according to an embodiment. Process block 602 proceeds to process block 604, according to an embodiment.

At process block 604, process 600 defines a plurality of regions of interest (ROIs) for the pixel array at least partially based on the gaze vector, according to an embodiment. Process block 604 proceeds to process block 606, according to an embodiment.

At process block 606, process 600 transmits ROI configuration settings to the image sensor, according to an embodiment. Process block 606 proceeds to process block 608, according to an embodiment.

At process block 608, process 600 receives a plurality of data frames from the image sensor, wherein the plurality of data frames include the image data that is ordered by the plurality of ROIs, according to an embodiment. Process block 608 proceeds to process block 610, according to an embodiment.

At process block 610, process 600 provides display data on the display at least partially based on the plurality of data frames, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (TIMID) connected to a host computer system, a standalone HMID, a mobile device or computing system, or any other hardware platform capable of providing artificial reality content to one or more viewers.

The term "processing logic" (e.g., 120, 136) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., 124, 126, 132, and/or 134) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels 157 and 159 may include or be routed through one or more wired or wireless communication utilizing IEEE 802.11 protocols, MIPI, CSI1, CSI2, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor, comprising:
a pixel array having a plurality of pixels;
readout circuitry configured to read image data from the pixel array for each of the plurality of pixels; and
processing logic configured to:
identify a plurality of regions of interest (ROIs) within the pixel array;
associate the image data for at least one of the plurality of pixels with at least one of the plurality of ROIs;
arrange the image data into a plurality of data frames, wherein the plurality of data frames include the image data ordered by the plurality of ROIs; and
transmit the plurality of data frames in an order that is based on the plurality of ROIs.

2. The image sensor of claim 1, wherein the plurality of data frames include the image data grouped by the plurality of ROIs for each row of the pixel array, wherein the plurality of data frames are transmitted row-by-row for the plurality of pixels in the pixel array.

3. The image sensor of claim 2, wherein the plurality of pixels include active pixels and inactive pixels, wherein the plurality of data frames include the image data of the active pixels and omit the image data of the inactive pixels.

4. The image sensor of claim 1, wherein each of the plurality of data frames is ordered and transmitted as an entire one of the plurality of ROIs, wherein the image data of a first of the plurality of ROIs is transmitted prior to the image data of a second of the plurality of ROIs.

5. The image sensor of claim 4, wherein the readout circuitry is configured to read the image data one ROI at a time.

6. The image sensor of claim 1, wherein a first of the plurality of ROIs overlaps with a portion of a second of the plurality of ROIs.

7. The image sensor of claim 1, wherein the processing logic is configured to i) define active pixels and inactive pixels in the pixel array and ii) remove the image data for the inactive pixels from the plurality of data frames.

8. The image sensor of claim 1, wherein the processing logic is configured to: i) receive ROI configuration settings and ii) define a size and a sampling ratio for each of the plurality of ROIs based on the ROI configuration settings.

* * * * *